US012689554B2

(12) United States Patent　　(10) Patent No.:　US 12,689,554 B2
Uber et al.　　(45) Date of Patent:　Jul. 21, 2026

(54) AGENT APPLICATION FOR MANAGING INFORMATION TECHNOLOGY INFRASTRUCTURES

(71) Applicant: International Business Machines Corporation, Armonk, NY (US)

(72) Inventors: Ryan Uber, Oceanside, CA (US); Christopher Arcand, Bear Lake, MN (US); Robert Tillery, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 17/229,522

(22) Filed: Apr. 13, 2021

(65) Prior Publication Data

US 2022/0329480 A1　　Oct. 13, 2022

(51) Int. Cl.
*H04L 12/24*　　(2006.01)
*H04L 12/46*　　(2006.01)
*H04L 41/0806*　　(2022.01)
*H04L 41/082*　　(2022.01)
*H04L 41/50*　　(2022.01)
*H04L 41/5041*　　(2022.01)

(52) U.S. Cl.
CPC ........ *H04L 41/082* (2013.01); *H04L 12/4641* (2013.01); *H04L 41/0806* (2013.01); *H04L 41/5032* (2013.01); *H04L 41/5041* (2013.01)

(58) Field of Classification Search
CPC ............... H04L 41/082; H04L 12/4641; H04L 41/0806; H04L 41/5032; H04L 41/5041; H04L 12/4625; H04L 12/4633; H04L 41/0869
See application file for complete search history.

(56) References Cited

U.S. PATENT DOCUMENTS

| | | | | |
|---|---|---|---|---|
| 11,341,245 | B1 * | 5/2022 | Voss .................... | G06F 11/2094 |
| 11,483,405 | B2 * | 10/2022 | Le ........................... | H04L 67/34 |
| 2015/0347118 | A1 * | 12/2015 | Yeung ...................... | G06F 8/65 |
| | | | | 717/172 |
| 2016/0117162 | A1 * | 4/2016 | Searle ................. | H04L 41/0893 |
| | | | | 717/173 |

(Continued)

*Primary Examiner* — Brian J. Gillis
*Assistant Examiner* — Juan C Turriate Gastulo
(74) *Attorney, Agent, or Firm* — CANTOR COLBURN LLP; Rakesh Roy

(57) ABSTRACT

Methods and systems disclosed herein relate generally to systems and methods for configuring an agent application provisioned within a private information technology infrastructure. The agent application provisioned in a private information technology infrastructure receives a payload comprising a set of parameters that include information that identifies that an update of the agent application is available. The agent application parses the set of parameters to determine that the update of the agent application is available. The agent application receives an updated component for modifying one or more functions of the agent application. The agent application deactivates a component of the agent application that corresponds to the updated component. The agent application replaces the deactivated component of the agent application with the updated component, in which one or more other components of the agent application continue their respective operations.

22 Claims, 8 Drawing Sheets

(56) References Cited

U.S. PATENT DOCUMENTS

| | | | | |
|---|---|---|---|---|
| 2018/0302494 | A1* | 10/2018 | Jain | ..................... G06F 11/3438 |
| 2020/0374188 | A1* | 11/2020 | Narasimhan | ............ H04L 67/56 |
| 2021/0397429 | A1* | 12/2021 | Gonzalez | ................. G06F 8/65 |
| 2021/0405995 | A1* | 12/2021 | Sharma | ................ H04L 67/303 |

* cited by examiner

300

700

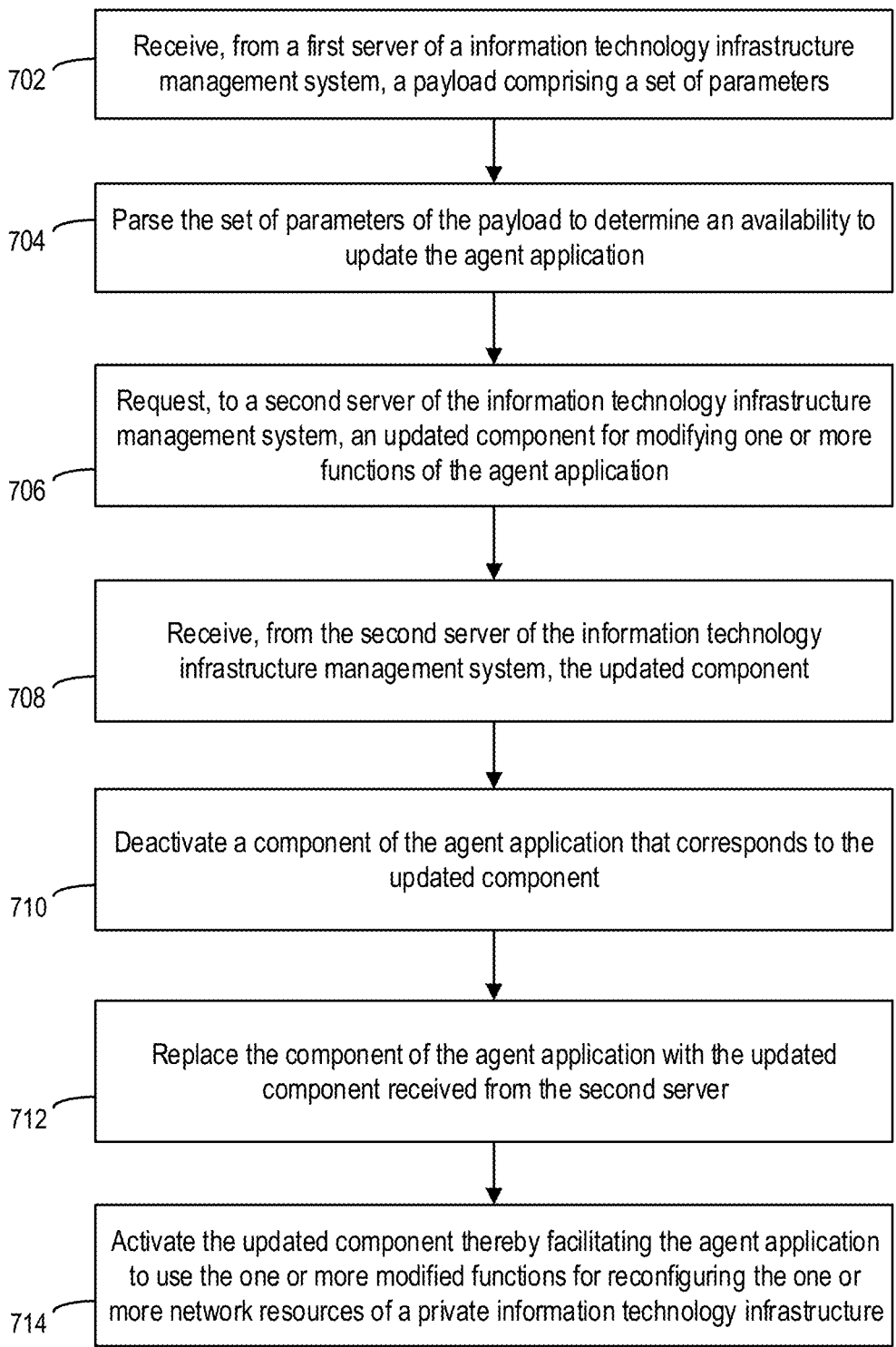

702    Receive, from a first server of a information technology infrastructure management system, a payload comprising a set of parameters 704    Parse the set of parameters of the payload to determine an availability to update the agent application 706    Request, to a second server of the information technology infrastructure management system, an updated component for modifying one or more functions of the agent application 708    Receive, from the second server of the information technology infrastructure management system, the updated component 710    Deactivate a component of the agent application that corresponds to the updated component 712    Replace the component of the agent application with the updated component received from the second server 714    Activate the updated component thereby facilitating the agent application to use the one or more modified functions for reconfiguring the one or more network resources of a private information technology infrastructure

*FIG. 7*

AGENT APPLICATION FOR MANAGING INFORMATION TECHNOLOGY INFRASTRUCTURES

TECHNICAL FIELD

The present disclosure generally relates to information technology infrastructure. More specifically, but not by way of limitation, this disclosure relates to configuring an agent application provisioned within an information technology infrastructure.

BACKGROUND

Information technology (IT) infrastructure may refer to the hardware resources, software resources, and/or network resources forming an enterprise's information technology environment. For example, hardware resources may include servers, computers, data centers, switches, hubs, routers, and/or the like. Meanwhile, software resources may include enterprise resource planning (ERP) software applications, customer relationship management (CRM) software applications, productivity software applications, and/or the like. The network resources of the enterprise's information technology infrastructure may include any resources providing network enablement, network connectivity, network security, and/or the like.

The information technology infrastructure of the enterprise may enable the delivery of information technology services and/or solutions to a variety of internal and external users including, for example, employees, partners, customers, and/or the like. For instance, the hardware resources of the enterprise's information technology infrastructure may be used to host the software resources. At least some of the software resources within the enterprise's information technology infrastructure may be available remotely, for example, as a software-as-a-service (SaaS), a web application, and/or the like. Remote access to these software resources may be enabled and/or regulated by the network resources within the enterprise's information technology infrastructure.

In some instances, the information technology infrastructure is provisioned and managed using one or more infrastructure provisioning applications. The provisioning applications can facilitate automatic building, changing, and versioning of information technology infrastructures. For example, a configuration file of the infrastructure provisioning application can include declarative programming codes, and the provisioning application can execute the configuration file to manage several components of the infrastructure in a manner specified by a user. The components of the infrastructure can range from low-level components such as compute instances, storage, and networking, to high-level components such as DNS entries, SaaS features, etc. The provisioning applications can be used across different information technology infrastructures provided by their respective service providers.

The infrastructure provisioning applications can be accessed by customers through one or more SaaS applications. Typically, the SaaS applications are implemented within a server associated with a corresponding information technology infrastructure management system, at which customers can use one or more application programming interfaces (APIs) to access the provisioning application and perform various types of infrastructure-management operations. The above configuration allows the provisioning application to remain separate and independent from network resources of the managed infrastructure. As a result, the provisioning application can be efficiently debugged and updated, without necessarily reconfiguring the customer's information technology infrastructure. In addition, the provisioning application can remain secure in the event that the security of the managed infrastructure is compromised.

However, using the provisioning application as a SaaS application can be less effective for managing information technology infrastructures in some situations. For example, a SaaS application is typically unauthorized to access network resources of a private information technology infrastructure, which is typically secured by a private network. As a result, it can be challenging to use the provisioning application as a SaaS application to access and manage the private network resources. As indicated above, because the conventional techniques constrain the SaaS application to be executed only in certain information technology infrastructures, it becomes challenging for the corresponding provisioning applications to establish connections to and manage network resources of private network resources.

BRIEF SUMMARY

Certain embodiments involve a method and system for configuring an agent application provisioned within a private information technology infrastructure. The agent application provisioned in a private information technology infrastructure receives a payload comprising a set of parameters that include information that identifies that an update of the agent application is available. The agent application can be configured to receive one or more instructions from the first server of the information technology infrastructure management system for managing or otherwise configuring one or more network resources of the private information technology infrastructure. The agent application parses the set of parameters to determine that the update of the agent application is available. The agent application receives an updated component for modifying one or more functions of the agent application. The agent application deactivates a component of the agent application that corresponds to the updated component. The agent application replaces the deactivated component of the agent application with the updated component, while allowing one or more other components of the agent application continue their respective operations. The agent application activates the updated component, thereby facilitating the agent application to use the one or more modified functions for reconfiguring the one or more network resources of the private information technology infrastructure.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by some embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Features, embodiments, and advantages of the present disclosure are better understood when the following Detailed Description is read with reference to the accompanying drawings.

FIG. 7 illustrates a process 700 for configuring an agent application provisioned within a private information technology infrastructure, in accordance with some embodiments.

DETAILED DESCRIPTION

Figure 1:
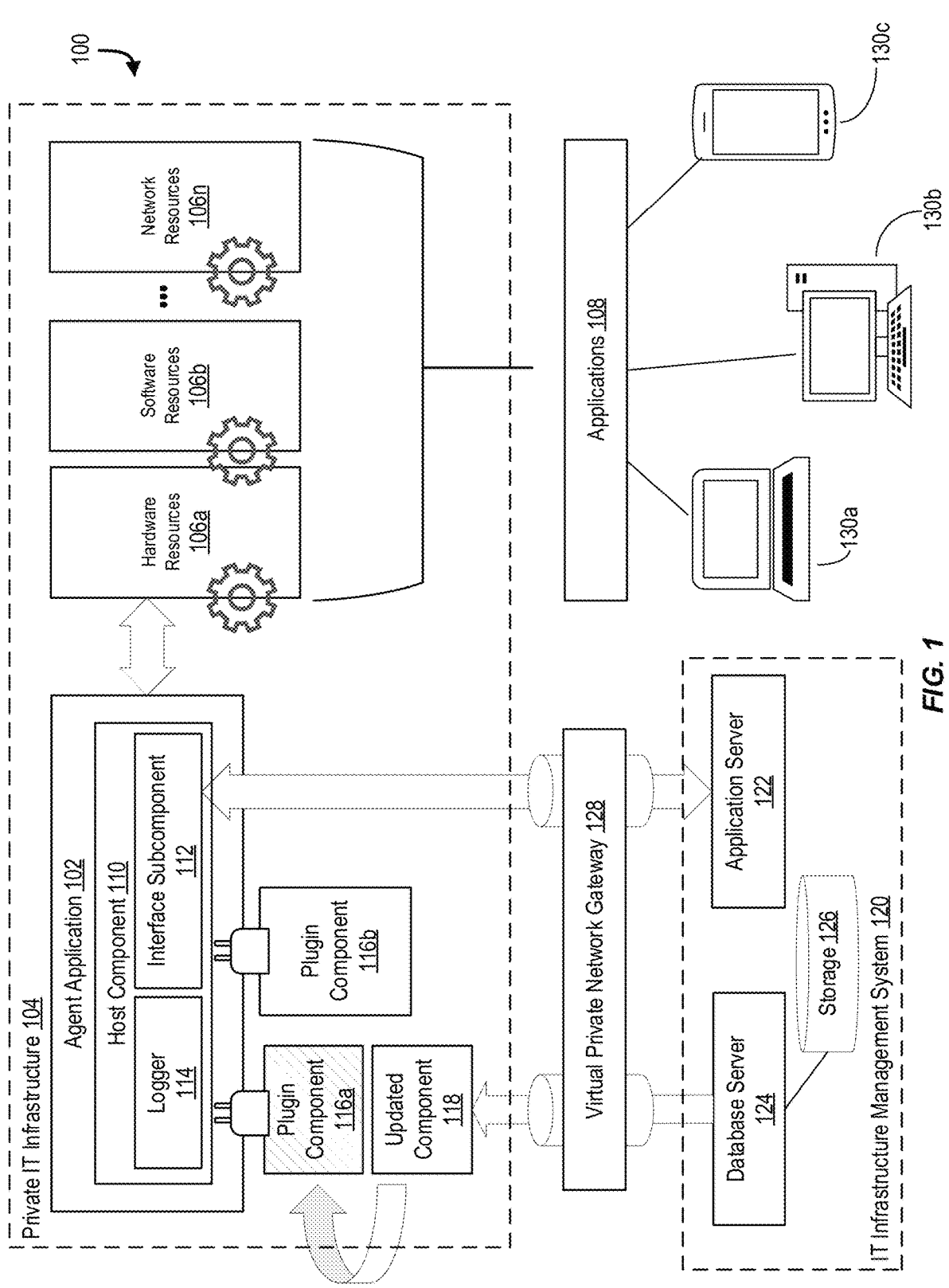
FIG. 1 illustrates an example of a computing environment for configuring an agent application provisioned within a private information technology infrastructure, in accordance with some embodiments.

Certain embodiments described herein can address one or more of the problems identified above by provisioning an agent application of a service provider within a private information technology infrastructure of a customer and remotely configuring the agent application to perform management of resources of the private information technology infrastructure and/or a hybrid information technology infrastructure (e.g., a combination of public and private information technology infrastructure). The agent application can be registered and provisioned within a private information technology infrastructure to manage network resources of a private information technology infrastructure. The agent application then receives, from a first server of an information technology infrastructure management system, a payload that includes a set of parameters. In some instances, the agent application periodically polls the first server via HTTP requests to receive the payload. The set of parameters can include information that identifies that an update of the agent application is available. The agent application can be configured to receive one or more instructions from the first server of the information technology infrastructure management system for managing or otherwise configuring one or more network resources of the private information technology infrastructure. For example, the set of parameters can include an identifier corresponding to the agent application, an authorization token, an agent version, and/or a data field that identifies that the update of the agent application is available. The first server can be an application server of the service provider that communicates with one or more agent applications via API calls.

The agent application parses the set of parameters of the payload to determine that the update of the agent application is available. For example, the first server receives a message from a version controller that an updated version of the agent application is available. In response to receiving the message, the first server generates a payload that indicates that the updated version is available and transmits the payload in response to an HTTP request submitted by the agent application.

The agent application requests, from a second server of the information technology infrastructure management system, an updated component for modifying one or more functions of the agent application. In some instances, the updated component can be a plugin component configured to replace an existing component of the agent application and modify the features that correspond to the existing component of the agent application. Additionally or alternatively, the updated component can be configured to add one or more features to the agent application. The plugin component for the agent application can separate a set of features (e.g., backend features for managing the infrastructure) from other features (e.g., frontend features including a command-line-interface feature) of the agent application. The second server can be a database server in which the updated component is stored. In some instances, the first and second servers correspond to the same server or the same cluster of servers of the service provider. In response to the request, the agent application can receive the updated component from the second server of the information technology infrastructure management system.

The agent application deactivates a component of the agent application that corresponds to the updated component and replaces the component of the agent application with the updated component received from the second server. In some instances, one or more other features of the agent application (e.g., command-line-interface features) continue operating while the component is being replaced with the updated component. The agent application can thus be updated with new features without unnecessarily disrupting the agent application from managing the network resources of the private infrastructure.

The agent application activates the updated component. In effect, the agent application can use the updated component to perform the one or more modified functions for reconfiguring the one or more network resources of the private information technology infrastructure.

As described herein, certain embodiments provide improvements to existing provisioning applications for managing information technology infrastructures. For example, the agent application provisioned within the private infrastructure allows management of its network resources while communicating with the information technology infrastructure management system via one or more API calls. Such configuration can be implemented within a presence of a virtual private network, thus allowing the private infrastructure to be effectively managed without extensively reconfiguring the provisioning application. Further, the agent application is configured such that a component corresponding to one or more features can be easily replaced with an updated component, without disrupting other processes being executed by the agent application.

I. Overview of Configuring an Agent Application Provisioned Within a Private Information Technology Infrastructure FIG. 1 illustrates an example of a computing environment 100 for configuring an agent application provisioned within a private information technology infrastructure, in accordance with some embodiments. Referring to FIG. 1, the computing environment 100 may include an agent application 102 that is provisioned within a private information technology infrastructure 104. The agent application 102 can be a binary application installed in one or more servers of the private information technology infrastructure. In some instances, the agent application 102 is configured to provision, manage, de-provision, and/or otherwise configure at least part of the hardware resources 106a, software resources 106b, and/or network resources 106n. For example, the agent application 102 can be a software-container image that executes one or more workloads within the private information technology infrastructure 104 that is secured by a virtual private network. An application 108 accessed by one or more client devices 103a-c can be executed using the hardware resources 106a, software resources 106b, and/or network resources 106n of the private information technology infrastructure 104.

In some instances, the computing environment 100 includes a set of agent-application pools, in which one or more agent applications (including the agent application 102) assigned to a particular agent-application pool is configured to manage resources hosted within a particular type of the private information technology infrastructure 104. For example, an agent application of a first agent-application pool can be configured to execute workloads to manage resources hosted in a first type of private information technology infrastructure, whereas another agent application of a second agent-application pool can be configured to execute workloads to manage resources hosted in a second type of private information technology infrastructure that is different from the first type of private information technology infrastructure. The availability of agent application pools facilitates targeting of specific workloads for specific private infrastructures.

The agent application 102 can include a set of application components for managing the resources of the private information technology infrastructure 104. For example, the agent application 102 may include a host component 110 and plugin components 116a-b. The host component 110 can include programming instructions that define how the agent application 102 operates. The host component can further include a plugin registry that identifies names of the plugin components 116a-b and the protocol for accessing them. In some instances, the host component 110 is used to declare one or more extension points, which can be used for connecting the plugin components 116a-b to the host component 110.

In some instances, the host component 110 includes a user-interface subcomponent 112 that communicates with one or more servers of an information technology management system 120. For example, the user-interface subcomponent 112 can receive a first payload that includes a set of parameters for configuring one or more network resources of the private information technology infrastructure. The set of parameters of the first payload can include information for configuring the hardware resources 106a, software resources 106b, and/or network resources 106n of the private information technology infrastructure 104. For example, the set of parameters can include an identifier corresponding to the agent application, an authorization token, an agent version, and/or a data field that identifies one or more encrypted functions for managing the hardware resources 106a, software resources 106b, and/or network resources 106n.

In another example, the user-interface subcomponent 112 can receive a second payload that includes a set of parameters that identifies that an update of the agent application is available. The set of parameters of the second payload can include an authorization token, an agent version, and/or a data field that identifies that the update is available. In some instances, the data field includes one or more identifiers corresponding to an updated component (e.g., an updated component 118). To receive the first and/or second payload, the user-interface subcomponent 112 periodically polls the first server via HTTP requests.

The host component 110 can also include a logger 114, which stores a log of transactions and failures corresponding to operations of plugin components. Although not shown, the host component 110 can provide other core functionalities, including security, versioning, database access, caching, etc. For example, the host component 110 can additionally include a subcomponent for providing a command-line-interface ("CLI") to a user, such that the user can view the current operational status or modify one or more configurations of the agent application.

In some instances, the agent application 102 is configured to implement one or more plugin components 116a-b. The plugin components 116a-b can be stand-alone, independent components of the agent application 102 that include programming instructions for specialized processing, additional features, and customized functions configured to enhance or extend the host component 110 to produce additional capabilities. In some instances, the plugin components 116a-b are independent of other plug-in modules. Additionally or alternatively, the plugin components 116a-b can communicate with each other.

In some instances, one or more of the plugin components 116a-b may be replaced with other plugin components to modify existing features and/or add new features of the agent application 102. For example, the agent application 102 may deactivate the plugin component 116a and replace it with an updated component 118 received from the information technology management system 120. During the replacement of the plugin component 116a, features of the host component 110 (e.g., the interface subcomponent 112) continue operating. The agent application can be updated with new features of the updated component 118 without disrupting the operations performed by the host component 110. The host component 110 can thus be complemented with additional features of the plugins, thereby allowing the agent application 102 to obtain extensibility, flexibility, and isolation of application features and customs processing logic.

In some instances, one or more servers of the information technology management system 120 remotely configures the agent application 102 to perform management of the hardware resources 106a, software resources 106b, and/or network resources 106n of the private information technology infrastructure 104. In some instances, the information technology management system 120 includes an application server 122 and a database server 124. The application server 122 may be any computing device of the information technology management system 120 that is configured to transmit instructions to the agent application 102 for managing the private information technology infrastructure 104. The application server 122 can include an application-programming-interface (API) server configured to communicate with the interface subcomponent 112 of the agent application 102 using one or more API calls and corresponding responses. Additionally and alternatively, the application server 122 may provide any suitable service and/or processing for the agent application. For example, the application server 122 may perform data processing in response to status messages received from the agent application 102. The application server 122 may also store any protocols and/or user preferences (e.g., configurations specified in a configuration file) related to the operation of the agent application 102.

The database server 124 can be a server that is coupled to a database and may include any hardware, software, other logic, or combination of the preceding for servicing the requests to access data stored in a storage device 126. For example, the agent application 102 can communicate with the database server 124 to access the updated component 118. In some instances, the application server 122 and/or the database server 124 refers to a cluster or system of computers. For instance, the application server 122 can be a mainframe, a minicomputer cluster, or a group of servers functioning as a unit.

In some instances, the application server 122 and/or the database server 124 obtains authorization from a virtual private network gateway 128 to access the hardware resources 106a, software resources 106b, and/or network resources 106n of the private information technology infrastructure 104. The virtual private network gateway 128 can include any device or set of devices capable of providing secured and encrypted access to the private information technology infrastructure 104, thereby preventing unauthorized access from other devices. In some instances, the virtual private network gateway 128 includes security mechanisms such as secure tokens, passwords, and other procedures of identification for granting access. The virtual private network gateway 128 can use different tunneling protocols including the Point-to-Point Tunneling Protocol (PPTP), the Layer 2 Tunneling Protocol (L2TP), Layer 2 Forwarding (L2F) and generic routing encapsulation (GRE). Also, standard encryption technologies can be used including the Data Encryption Standard (DES), 3DES, and the 40/128-bit RC4 for Microsoft Point-to-Point Encryption (MPPE).

Figure 2:
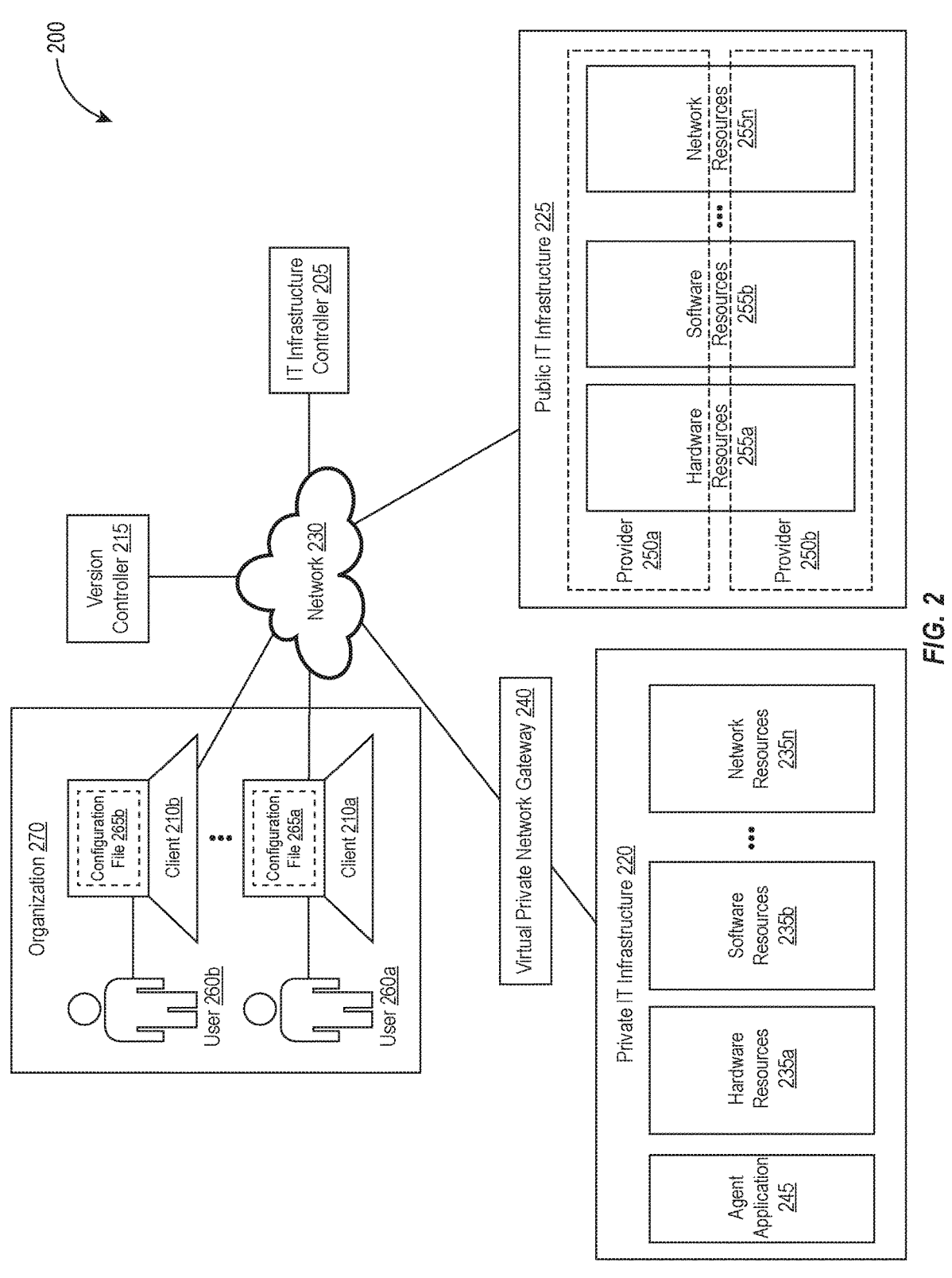
FIG. 2 illustrates an example of a computing environment in which an agent application interacts with an information technology infrastructure management system, in accordance with some embodiments.

II. Computing Environment for Configuring an Agent Application Provisioned Within a Private Information Technology Infrastructure FIG. 2 illustrates a computing environment 200 in which an agent application interacts with an information technology infrastructure management system, in accordance with some embodiments. Referring to FIG. 2, the computing environment 200 may include an information technology infrastructure controller 205, a first client 210a, a second client 210b, and a version controller 215. Furthermore, the computing environment 200 may include one or more information technology infrastructures including, for example, a private information technology infrastructure 220, a public information technology infrastructure 225, and/or the like. As FIG. 2 shows, the information technology infrastructure controller 205, the first client 210a, the second client 210b, the private information technology infrastructure 220, the public information technology infrastructure 225, and/or the version controller 215 may be communicatively coupled via a network 230. The network 230 may be any wired and/or wireless network including, for example, a local area network (LAN), a wide area network (WAN), a public land mobile network (PLMN), the Internet, and/or the like.

Referring again to FIG. 2, each of the private information technology infrastructure 220 and the public information technology infrastructure 225 may include a plurality of resources from one or more different providers including, for example, physical equipment, virtual machines, and/or the like. To further illustrate, FIG. 2 shows the private information technology infrastructure 220 as including, for example, hardware resources 235a, software resources 235b, network resources 235n, and/or the like. In some instances, the public information technology infrastructure 225 can communicate with clients 210a and/or 210b via the network 230.

In some instances, the clients 210a and/or 210b obtain access through a virtual private network gateway 240 to access the private information technology infrastructure 220 using one or more virtual private networks. In embodiments, the virtual private network gateway 240 can include any device or set of devices capable of facilitating secure and encrypted communications between two or more networks or devices. For example, the virtual private network gateway 240 may be able to facilitate encrypted access between the client 210a and the private information technology infrastructure 220 through the network 230, such that the private information technology infrastructure 220 is protected from access outside the virtual private network. In some instances, one or more gateway devices of the clients 210a and/or 210b communicate with the virtual private network gateway 240 to access the private information technology infrastructure 220. In some embodiments, one or more routers may be used to facilitate communications between the two or more networks or devices. Additionally or alternatively, the virtual private network gateway 240 may be an application capable of facilitating communications between two or more networks or devices. For example, the virtual private network gateway 240 may be an application executing on one or more servers that facilitates communications between the clients 210a and/or 210b and the private information technology infrastructure 220 through the network 230.

The virtual private network gateway 240 can support multiple tunnels for a single connection. Each tunnel connection may be able to independently facilitate communications between the clients 210a and/or 210b and the private information technology infrastructure 220 through the network 230. Redundant tunnel connections in single connection may be useful for providing communications between networks or devices when one or more tunnels become unavailable. For example, if a first tunnel connection fails, then the clients 210a and/or 210b may still be able to access the virtual private network through a second tunnel in the virtual private network gateway 240 and through the network 230.

In some instances, the virtual private network may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the virtual private network may be a single network. In other embodiments, the virtual private network may comprise two or more networks. In an embodiment, the virtual private network may be a network that is managed by one or more entities. For example, the virtual private network may be managed by a computing resource provider such as a cloud computing provider.

To configure the resources 235a, 235b, and 235n of the private information technology infrastructure 220, the client 210a (for example) can submit a configuration file 265a to the information technology infrastructure controller 205. In response, the information technology infrastructure controller 205 transmits, via the virtual private network gateway 240, one or more instructions to an agent application 245 provisioned within the private information technology infrastructure 220. In some instances, the one or more instructions facilitate the agent application to provision, manage, de-provision, and/or otherwise configure at least part of the hardware resources 235a, software resources 235b, and/or network resources 235n, such that one or more applications can be deployed and executed using the private information technology infrastructure 220. For example, the user 260a can download and execute the agent application 245 in one or more servers of the private information technology infrastructure 220. Once activated, the agent application 245 can communicate with information technology infrastructure controller 205 (e.g., via API calls) to pull operation instructions and provide status updates as it executes the instructions.

The public information technology infrastructure 225 may include resources from multiple providers including, for example, a first provider 250a, a second provider 250b, and/or the like. For example, at least one of the first provider 250a and the second provider 250b may be a private provider such that at least a portion of the hardware resources 255a, the software resources 255b, and/or the network resources 255n are private resources owned and operated by an enterprise for exclusive use by the enterprise. Alternatively and/or additionally, at least one of the first provider 250a and/or the second provider 250b may be a third party provider including, for example, an infrastructure-as-a-service (IaaS) provider, a platform-as-a-service (PaaS) provider, a software-as-a-service (SaaS) provider, and/or the like. As such, at least a portion of the hardware resources 255a, the software resources 255b, and/or the network resources 255n may be public resources shared amongst multiple enterprises.

In some example embodiments, the information technology infrastructure controller 205 may be configured to provide lifecycle management for one or more information technology infrastructures including, for example, the private information technology infrastructure 220, the public information technology infrastructure 225, and/or the like. For example, the information technology infrastructure controller 205 may provide lifecycle management for the private information technology infrastructure 220 by enabling the agent application 245 to at least manage the provisioning, modifying, and/or de-provisioning of one or more of the hardware resources 235a, the software resources 235b, and the network resources 235n. In another example, the information technology infrastructure controller 205 may provide lifecycle management for the public information technology infrastructure 225 by at least directly managing the provisioning, modifying, and/or de-provisioning of one or more of the hardware resources 255a, the software resources 255b, and the network resources 255n. The provisioning, modifying, and/or de-provisioning of one or more of the hardware resources, the software resources, and the network resources may be engendered by the deployment, testing, and/or maintenance of a software application.

In some example embodiments, the information technology infrastructure controller 205 may provision, modify, and/or de-provision one or more resources in the private information technology infrastructure 220 and/or the public information technology infrastructure 225 as part of configuring the private information technology infrastructure 220 and/or the public information technology infrastructure 225 to host the software application and/or to ensure that the performance of the software application meets a threshold metric (e.g., a service level objective (SLO) and/or the like). However, it should be appreciated that the private information technology infrastructure 220 and/or the public information technology infrastructure 225 may be configured and/or reconfigured to achieve any information technology objective including, for example, support for multi-tier software applications, self-service clusters, software demonstrations, disposable environments (e.g., production environments, staging environments, and/or the like), software defined networking, resource schedulers, multi-cloud deployment, and/or the like.

In some embodiments, at least a portion of the private information technology infrastructure 220 and/or the public information technology infrastructure 225 may be configured using infrastructure as code (IaC). That is, instead of and/or in addition to physical hardware configuration, the private information technology infrastructure 220 and/or the public information technology infrastructure 225 may be configured via software using, for example, one or more configuration files specifying the configurations to apply to the private information technology infrastructure 220 and/or the public information technology infrastructure 225 as well as one or more corresponding variables. For instance, in order to support the deployment, testing, and/or maintenance of a software application at the private information technology infrastructure 220, the private information technology infrastructure 220 may be configured based on a first configuration file 265a and/or a second configuration file 265b created respectively, for example, by a first user 260a at the first client 210a and a second user 260b at the second client 210b. As shown in FIG. 2, the first user 260a at the first client 210a and the second user 260b at the second client 210b may be associated with a same organization, for example, an organization 270. However, it should be appreciated that the first user 260a at the first client 210a and the second user 260b at the second client 210b may be associated with different organizations.

The first configuration file 265a and the second configuration file 265b may each include a programming code-based representation of the hardware resources 235a, the software resources 235b, and/or the network resources 235n in the private information technology infrastructure 220. For example, the first configuration file 265a and/or the second configuration file 265b may include programming instructions having syntax corresponding to a declarative language and/or a in data interchange language (e.g., JavaScript Object Notation (JSON)) that is human readable and editable as well as machine readable. Moreover, the first configuration file 265a and/or the second configuration file 265b may specify one or more configurations to apply to the private information technology infrastructure 220 including, for example, the provisioning, modification, and/or de-provisioning of the hardware resources 235a, the software resources 235b, and/or the network resources 235n.

In some example embodiments, the information technology infrastructure controller 205 may be configured to generate, based at least on the first configuration file 265a and/or the second configuration file 265b, an execution plan for applying, to the private information technology infrastructure 220, the one or more configurations specified in the first configuration file 265a and/or the second configuration file 265b. For example, the first configuration file 265a and/or the second configuration file 265b may be sent to the version controller 215 before being transferred to the information technology infrastructure controller 205. The version controller 215 may be configured to manage and/or reconcile different versions of the first configuration file 265a and/or the second configuration file 265b. It should be appreciated that the version controller 215 may be any version control system, revision control system, and/or source control system capable of tracking and managing changes made to a configuration file by one or more users. For instance, the version controller 215 may be Github, Github Enterprise, GitLab, GitLab EE and CE, Bitbucket Cloud, Bitbucket Server, and/or the like. Alternatively and/or additionally, the version controller 215 may be a private and/or proprietary version control system implemented for exclusive use by an enterprise.

III. Techniques for Distributing the Agent Application Provisioned Within a Private Information Technology Infrastructure The agent application can be distributed by the information technology infrastructure management system to a private information technology infrastructure as a binary file format and/or a container image format. In some instances, a version of the binary file and/or the container image is identified to the user, to facilitate selection of a particular agent application version for installation within the private information technology infrastructure. In either case, the agent application can be downloaded and executed within the private information technology infrastructure, at which instructions to manage the resources can be transmitted from the information technology infrastructure management system. In some instances, the agent application can be modified to execute in the customer environment, by adding additional container image layers or by performing a custom installation of the binary. In effect, the above approach can provide an enormous amount of flexibility in how the agent application is built, customized, and distributed.

With respect to the binary distribution, the agent application can be distributed in two binary files: (1) a first binary corresponding to the main agent application wrapper; and (2) a second binary corresponding to the plugin component. In some instances, the two binaries are packaged and distributed together, to allow the users to fetch the agent application as a single download. The plugin component upgrades for the binary distribution can be performed by downloading and extracting the relevant plugin binary from the package.

With respect to the container distribution, the agent application can be implemented within the private information technology infrastructure without any modification. In some instances, the container identifies required inputs for the agent application to connect to and pull instructions from the information technology infrastructure management system directly from the command line.

IV. Techniques for Configuring the Agent Application Provisioned Within a Private Information Technology Infrastructure As described herein, an agent application can be implemented and distributed such that execution of specific components of an information technology management system can be offloaded to a private information technology infrastructure. For example, a customer of the private information technology infrastructure can download and execute one or more agent applications in a network context of his or her choosing, at which the agent applications communicate with the information technology management system to pull instructions and provide status updates as they execute.

In some instances, the agent application is configured to process workloads from the information technology management system only. This allows customers to effectively relocate the invocation of some infrastructure management functionalities (e.g., command line interface) away from the information technology management system, and into a private network within the private information technology infrastructure. The above technique can be advantageous in that private APIs and other network interfaces are able to remain private, thereby avoiding the requirement of a customer to punch holes in firewalls or perform other practices that may compromise security of the private information technology infrastructure.

A. Initial Configuration of the Agent Application

The agent application can be launched within the private information technology infrastructure based on a set of configuration options identified by using a CLI provided by the information technology infrastructure management system. The configuration mechanisms for the agent application include environment variables and CLI flags. There is only minimal configuration needed using the CLI tools, and avoiding a configuration file approach will make operating the agent application easier using tools provided by container runtimes and other orchestrators. As an example, the configuration options of the CLI can include the following:

TABLE 1

| CLI Flag | Environment Variable | Description |
|---|---|---|
| -token | TFC_AGENT_TOKEN | The authentication token to use during agent registration. This token is generated by the information technology infrastructure management system. The token also identifies the context of work the agent application will pull, scoping it down to the appropriate organization. |
| -address | TFC_ADDRESS | Optional. The address of the information technology infrastructure management system installation. |
| -name | TFC_AGENT_NAME | Optional. A user-defined name to identify the agent application. |
| -log-level | TFC_AGENT_LOG_LEVEL | Optional. The log level for all agent logs. Valid levels are (from most to least verbose): trace debug info warn error. Defaults to info. |

TABLE 1-continued

| CLI Flag | Environment Variable | Description |
|---|---|---|
| -single | TFC_AGENT_SINGLE | Optional. When this flag is set, the agent application will perform at most one job, and exit immediately after. |

The CLI can also natively support all HTTP proxy-related environment variables (e.g., HTTP_PROXY, HTTPS_PROXY, and NO_PROXY). All of these settings can be supported by the underlying runtime of the agent application itself.

B. Agent Application Workflow

Figure 3:
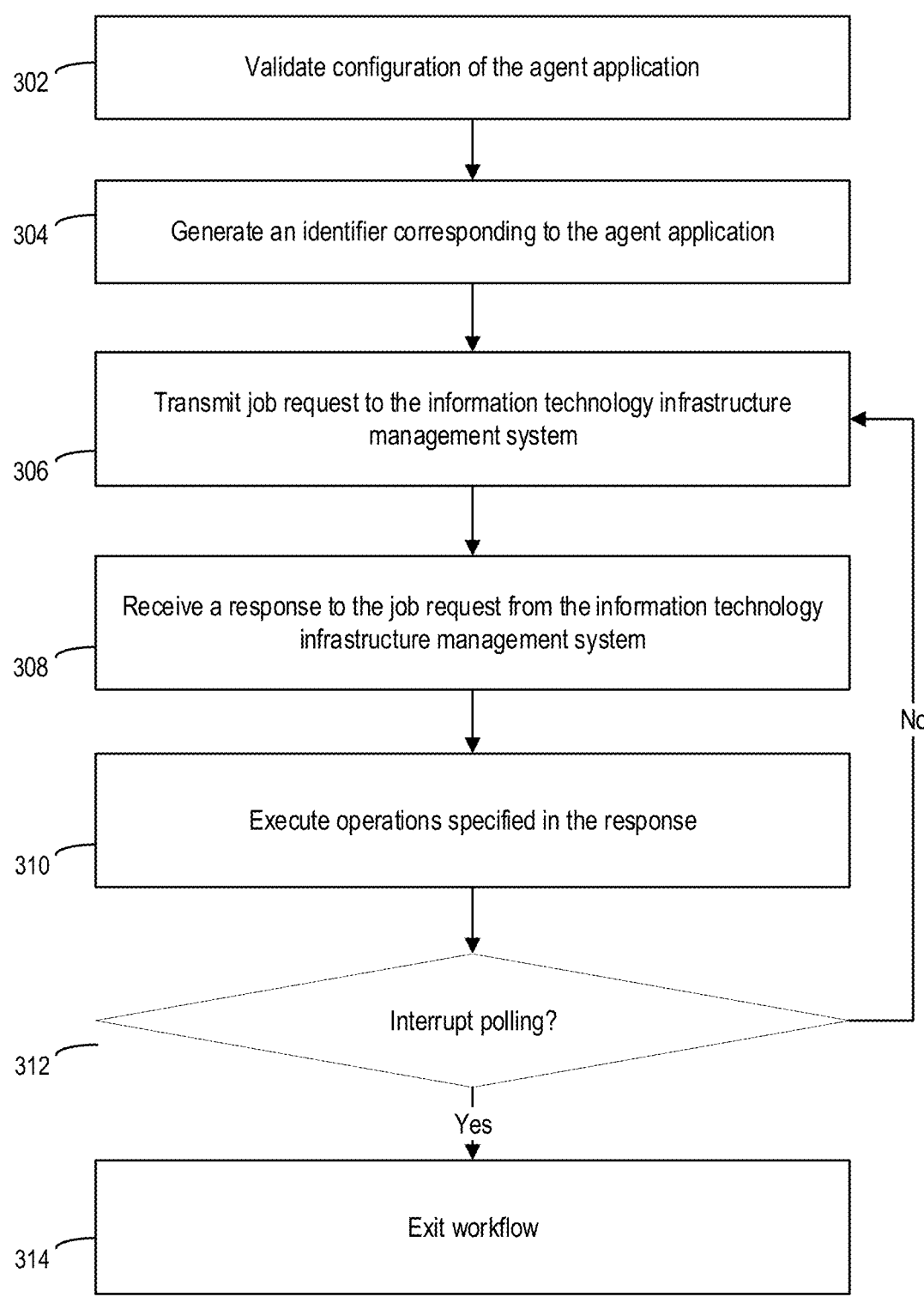
FIG. 3 illustrates a process for executing a workflow of an agent application provisioned within a private information technology infrastructure, in accordance with some embodiments.

FIG. 3 illustrates a process 300 for executing a workflow of an agent application provisioned within a private information technology infrastructure, in accordance with some embodiments. For illustrative purposes, the process 300 is described with reference to the components illustrated in FIGS. 1 and/or 2, though other implementations are possible. For example, the program code for an agent application 102 of FIG. 1, which is stored in a non-transitory computer-readable medium, is executed by one or more processing devices to cause a server system to perform one or more operations described herein.

At step 302, the agent application validates the configuration specified by the CLI tools. If any aspect of the configuration is missing or malformed, the agent application issues an error and exits the workflow. At step 304, the agent application generates an identifier corresponding to the agent application. In some instances, the identifier is a random universally unique identifier, which can be used to identify the specific agent instance to the information technology infrastructure management system. The agent application can then enter a main job polling loop.

At step 306, the agent application transmits a job request to the information technology infrastructure management system. As used herein, the term "job" refers to a type of task to be performed by the agent application to configure and/or manage the resources of the private information technology infrastructure. In some instances, a user interface subcomponent of the agent application transmits the job request by polling an API component of the information technology infrastructure management system. If this is the first request since the agent application started, the job request can also act as an agent registration request.

At step 308, the agent application receives a response to the job request from the information technology infrastructure management system. In some instances, the response includes a payload structured in a data-interchange format (e.g., JSON). The agent application can determine that the response is non-empty, at which the agent application can acknowledge receipt of the response.

At step 310, the agent application executes operations specified in the response. In some embodiments, the operations specified in the response include one or more configurations for managing the resources of a private information technology infrastructure. The agent application can periodically update job status and push logs to the information technology infrastructure management system.

The agent application can continue polling for the next job from the information technology infrastructure management system and repeat steps 306 to 310 to continue managing the resources of a private information technology infrastructure. At step 312, the agent application determines whether the polling process should be interrupted. If it is determined that the polling process should not be interrupted ("no" path from the decision step 312), the agent application continues to transmit the job request to receive further instructions from the information technology infrastructure management system. If it is determined that the polling process should be interrupted ("yes" path from the decision step 312), the agent application exits the workflow process (step 314). In some instances, the agent application determines that the polling process should terminate by detecting an interruption signal (e.g., ctrl+c, SIGINT).

In some embodiments, a set of agent applications execute their respective operations to manage the resources of the private information technology infrastructure. In this instance, each agent application can execute the operations by serially working on a single job at a time. If higher concurrency is required, more agent application processes may be executed to handle the additional load.

C. Example of Requests and Responses Processed by the Agent Application

The agent application can implement a double-ended queue (alternatively referred herein as "dequeue") to process operations for managing resources of the private information technology infrastructure. In some instances, the agent application builds up the dequeue by adding one or more operations corresponding to a job ("work"), which are obtained from querying an API component of the information technology infrastructure management system. If the work is available for the agent application, an endpoint of the information technology infrastructure management system returns the next job. The agent application then performs one or more operations corresponding to the job specified by the information technology infrastructure management system. An example format of a job request message transmitted from the agent application can be structured as follows:

```
> GET /api/agent/jobs
> Authorization: Bearer d7918828e0ad8b40c8fb73a6cffdb712e1
> TFC-Agent-Version: 0.1.0
> TFC-Agent-Accept: plan,apply
> TFC-Agent-ID: 359075c0-2292-4de1-8aa0-cca05007454d
> TFC-Agent-Name: my-little-pony
```

In the request message, the TFC-Agent-Accept header can define the types of jobs the agent supports. In some instances, the agent application statically sets this header to plan, apply as part of its initialization. However, the header can be expanded to include other job types.

The TFC-Agent-Version header can include the semantic version number of the agent application. The version number is informational and is intended for the information technology infrastructure management system to be able to store and display the agent application versions.

The TFC-Agent-ID header can specify the agent application's unique identifier. In some instances, the TFC-Agent-ID header is generated each time the agent application process starts and is used to unambiguously identify the instance corresponding to the agent application.

The TFC-Agent-Name header can include a user-specified name for the agent, if any. In some instances, the TFC-Agent-Name header is set via the CLI or environment variable inputs. The above header can be used to provide a more human-approachable name for the specific agent application.

In addition to the request message, an example format of a response message returned by the information technology infrastructure management system can be structured as follows:

```
< HTTP/1.1 200 OK
< Content-Type: application/json
{
  "type": "apply",
  "data": {
    ... serialized data ...
  }
}
```

The type field in the response body can indicate a type of operations to be performed by the agent application. For example, the type field can include plan or apply, but can include other types of operations for managing the resources of the private information technology infrastructure.

The data field in the response body can include programming instructions to be performed by the agent application. In some instances, the data filed is a hash with an arbitrary structure, depending on which component of the agent application performs the specified operation. For example, in the case of a Apply, this data field would contain the serialized version of the Apply from the information technology infrastructure management system. The agent application can deserialize this data field onto the appropriate data struct based on the type field.

In some instances, the endpoint of the information technology infrastructure management system returns an HTTP 204 response with no body, in response to a determination that no jobs are ready to be executed. In response to the HTTP 204 response, transmission of the job request messages by the agent application may be temporarily suspended ("sleep") for an amount of time specified by Retry-After header presented by the response message. An example of the HTTP 204 response can include as follows:

```
< HTTP/1.1 204 OK
< Retry-After: 30
```

D. Example of Status Updates Transmitted by the Agent Application

The agent application can be configured to report status updates back to the information technology infrastructure management system. For example, while executing a job (specifically an Apply in this case), a status update message transmitted by the agent application can be structured as follows:

```
> PUT /api/agent/status
> Authorization: Bearer d7918828e0ad8b40c8fb73a6cffdb712e1
> TFC-Agent-Version: 0.1.0
> TFC-Agent-ID: 359075c0-2292-4de1-8aa0-cca05007454d
> TFC-Agent-Name: my-little-pony
{
  "status": "busy",
  "job": {
    "type": "apply",
```

-continued

```
  "data": {
    ... apply-specific status data ...
  }
 }
}
```

The status field in the request can specify the status of the agent application. For example, the status filed identifies a status of the agent wrapper process, and may include the following possible values: busy, idle, or exited. When the status is busy, the payload in the status update message can include a job hash.

The job field of the status field update message identifies job-specific data, including the job type and the serialized status update data. In some instances, the data field includes information such as the plan or apply ID, the status of the plan or apply, any relevant error messages, whether or not the plan contains changes (in the case of a plan), etc.

In response to the status update message, the information technology infrastructure management system can generate and transmit a response message. An example of the response message can be as follows:

```
< HTTP/1.1 200 OK
< Content-Type: application/json
{
  "job": {
    "type": "apply",
    "timestamp": "2020-07-23T18:59:48+00:00",
    "data": {
      "apply_id": "apply-1234",
      "signal": "cancel"
    }
  }
}
```

The response body may include additional instructions for the performing the job identified in the status update message. In some instances, the response body identifies one or more jobs to be executed by the agent application. For example, the data field may include additional instructions to evaluate during execution via the signal field, which has a value of either cancel or force-cancel. In some instances, the response body can include one or more timestamps, to allow the agent application to determine whether the additional instructions have already been executed. Additionally or alternatively, the information technology infrastructure management system can generate an HTTP 204 message or an empty JSON object in the event that there are no further jobs available to be executed by the agent application.

E. Plugin Component of the Agent Application

In some instances, the agent application updates one or more of its components to continue managing the resources of the private information technology infrastructure. For example, the agent application can update a plugin component to increase security of the agent application from unauthorized access. The agent application can update its components by isolating a core functionality into a plugin binary component, which can be cleanly separated from a host component that implements basic agent CLI process. Such architecture enables the information technology infrastructure management system to release updates to the plugin binary via an updated component. The agent application may then automatically download the updated component and replace the existing "core" without any user intervention, process restarts, etc. In some instances, the core updates are verified for integrity via their checksums, as well as checking the SHASUM signatures using a public hash key.

F. Isolation Between Jobs

Because the agent application is not a multi-tenant process (in which a set of resources are shared by multiple customers), the job isolation concerns can be considerably relaxed. However, it can be desirable to ensure that local side-effects generated from a particular job does not carry over into subsequent jobs. As such, process isolation can be implemented during each job of the agent application. Process isolation can be performed by using a jailing operation (e.g., executing a temp dir+chroot operation). However, the jailing operation may involve complex operating system requirements involving kernel capabilities, user and group permissions, etc.

In some instances, the agent application isolates the assigned job by creating a temporary directory (e.g., temp dir) at the start of each job execution, and changes the directory of the corresponding job (e.g., chdir) to the temporary directory prior to initiation of the job process. The agent application can delete the temporary directory at the end of each job. In effect, each job can be executed by the agent application with sufficient isolation.

Additionally or alternatively, the agent application can be initially configured with a CLI flag that causes the agent application to execute exactly one job at a time. A higher-level application scheduler (e.g., Nomad) can be used to ensure that a container or isolated fork/exec process is used at most once, and cleaned up thereafter. Such approach effectively delegates the isolation concerns to another application which already has strong isolation guarantees.

V. Additional Features of the Agent Application

In addition to features identified above (e.g., plan, apply), the agent application can be configured to perform other types of operations. Specifically, instead of just being able to receive instructions from an information technology infrastructure management system and apply the instructions to a private information technology infrastructure, the agent application can perform at least the following types of operations:

Version control operations: maintaining code stored within the private information technology infrastructure;

Sentinel policy checks: incorporating contexts for policies (e.g., HTTP imports) that can be applicable to the private information technology infrastructure; and Management of sensitive data: securely transmitting sensitive data to the information technology infrastructure management system and/or protecting the sensitive data to prevent it from being accessed by other third party service providers.

The additional features of the agent application can reduce the customer's burden of installing and configuring the infrastructure management system. For example, many customers can be overwhelmed with configuring the infrastructure management system when they simply need a way to provision resources of the private infrastructure within their security boundary. By providing the above additional features of the agent application, the operational burden can be further shifted to the information technology infrastructure management system.

For example, some organizations can encounter certain compliance requirements that state that the organizations must retain total and complete control over every line of code. In this example, configuring the agent application to handle all version control operations (including storage) can allow the organizations to control a subset of features while delegating other features to the agent application.

Additionally or alternatively, the agent application can be further configured (e.g., additional endpoints to incorporate additional plugin components) such that it can be ready for potential expansion.

Figure 4:
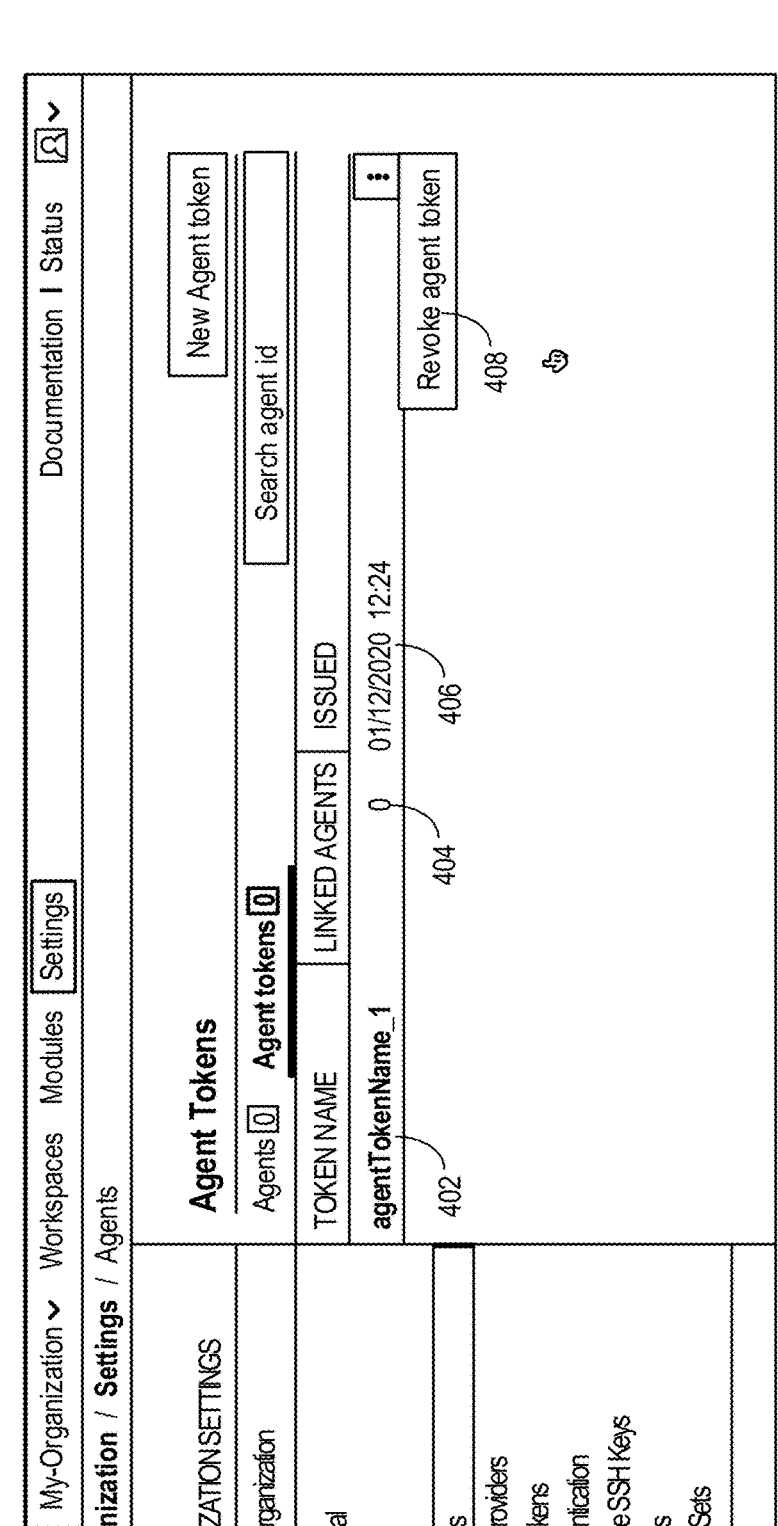
FIG. 4 shows a screenshot corresponding to a user interface of an information technology infrastructure management system for configuring an authorization token of an agent application.
Figure 5:
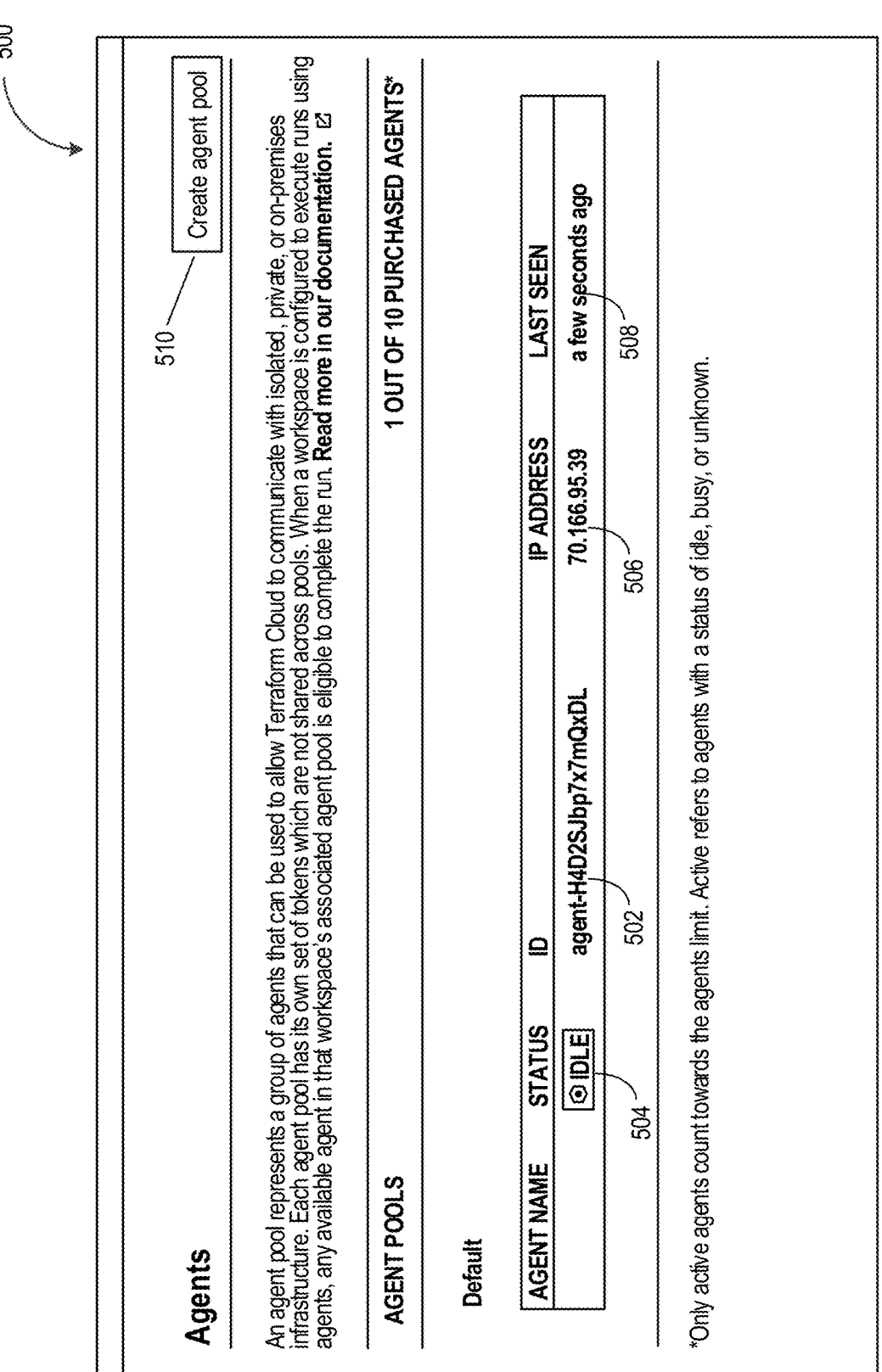
FIG. 5 shows a screenshot corresponding to a user interface of an information technology infrastructure management system that identifies an agent application provisioned within a private information technology infrastructure.
Figure 6:
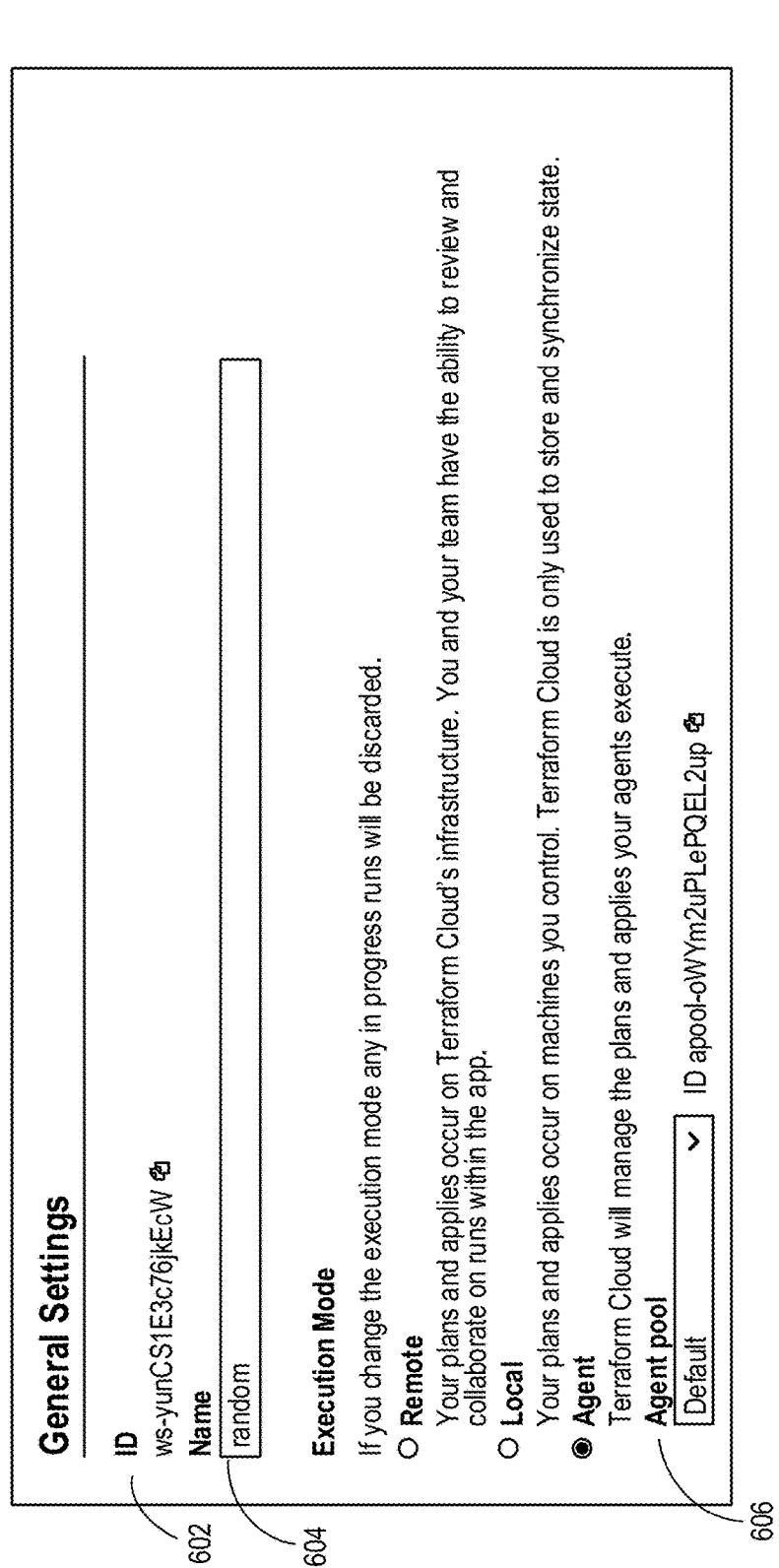
FIG. 6 shows a screenshot corresponding to a user interface of an information technology infrastructure management system that identifies initial configurations to manage resources corresponding to a target information technology infrastructure.

VI. Example Screenshots of a User Interface of an Information Technology Infrastructure Management System FIGS. 4-6 show an example set of screenshots that illustrate a user interface for configuring an agent application provisioned within a private information technology infrastructure, in accordance with some embodiments. For example, FIG. 4 shows a screenshot 400 corresponding to a user interface of an information technology infrastructure management system for configuring an authorization token of an agent application. As shown in the screenshot 400, the user interface identifies an authorization token corresponding to the agent application. As described here, the authorization token can be used during agent registration and can be generated by the information technology infrastructure management system. In some instances, the agent token identifies the context of work the agent application will pull and perform. The screenshot 400 includes a name field 402 corresponding to an identifier of the authorization token, a linked agents field 404 that identifies a number of agent applications associated with the authorization token, and a date and time field 406 that identifies when the authorization token was issued. In some instances, the authorization token is revoked by pressing a "Revoke agent token" option 408.

FIG. 5 shows a screenshot 500 corresponding to a user interface of an information technology infrastructure management system that identifies an agent application provisioned within a private information technology infrastructure. As shown in the screenshot 500, the user interface includes an agent identifier field 502 that identifies an identifier corresponding to the agent application, a status field 504 that identifies an operational status of the agent application, and a local IP address field 506 corresponding to an IP address in which the agent application is located. The user interface also includes a last seen field 508 that specifies the last time the information technology infrastructure management system was contacted by the agent application. The user interface also includes a create agent pool option 510, which allows an agent-application pool to be generated for managing resources of a particular private information technology infrastructure. New or existing agent applications can be subsequently assigned to the generated agent-application pool, such that the assigned agent application can execute workloads to manage resources of a corresponding private information technology infrastructure.

FIG. 6 shows a screenshot 600 corresponding to a user interface of an information technology infrastructure management system that identifies initial configurations to manage resources corresponding to a target information technology infrastructure. As shown in the screenshot 600, the user interface includes an identifier field 602 and a name field 604 for identifying a workspace configured to manage the resources corresponding to a target information technology infrastructure. In some instances, the user interface includes any description corresponding to the workspace, including operations to be performed by the workspace and a description of an execution plan for managing the resources. An execution mode field 606 can include multiple options on how the resources of the target information technology infrastructure. In this example, an "Agent"

option has been selected to manage resources of the private information technology infrastructure that is protected by a virtual private network.

VII. Overall Process for Configuring an Agent Application Provisioned Within Private Information Technology Infrastructure FIG. 7 illustrates a process 700 for configuring an agent application provisioned within a private information technology infrastructure, in accordance with some embodiments. For illustrative purposes, the process 700 is described with reference to the components illustrated in FIGS. 1 and/or 2, though other implementations are possible. For example, the program code for an agent application 102 of FIG. 1, which is stored in a non-transitory computer-readable medium, is executed by one or more processing devices to cause a server system to perform one or more operations described herein.

At step 702, the agent application receives, from a first server of an information technology infrastructure management system, a payload comprising a set of parameters. The agent application can be provisioned within a private information technology infrastructure (e.g., the private information technology infrastructure 104 of FIG. 1). The agent application can receive the payload in response to submitting a plurality of requests to the first server, in which each of the plurality of requests is transmitted at a time point of a preconfigured time interval. The payload can correspond to at least part of a JavaScript Object Notation (JSON) data transmitted by the first server of the information technology infrastructure management system. The first server of the information technology infrastructure management system can be an application server of an information technology infrastructure management system (e.g., information technology infrastructure management system 120 of FIG. 1). In some instances, the set of parameters include information indicating that an update of the agent application is available. The agent application can be configured to receive one or more instructions from the first server of the information technology infrastructure management system for managing or otherwise configuring one or more network resources of the private information technology infrastructure. In some instances, the agent application receives a second payload including a second set of parameters from the first server, in which the second set of parameters include one or more instructions from the first server to use an existing component of the agent application to configure the one or more network resources of the private information technology infrastructure.

At step 704, the agent application parses the set of parameters of the payload to determine that the update of the agent application is available. For example, the set of parameters can include an identifier corresponding to the agent application, an authorization token, an agent version, and/or a data field that identifies one or more encrypted functions for managing the customer's private information technology infrastructure. From the set of parameters, the agent application can determine that a value (e.g., "1", "true") of a corresponding data field (e.g., updates) indicates that the updated component is available.

At step 706, the agent application requests, from a second server of the information technology infrastructure management system, an updated component for modifying one or more functions of the agent application. The second server of the information technology infrastructure management system can be a database server of the information technology infrastructure management system (e.g., information technology infrastructure management system 120 of FIG. 1). In some instances, the first server and the second server are the same server.

At step 708, the agent application receives, from the second server of the information technology infrastructure management system, the updated component. In some instances, the agent application determines a checksum value corresponding to the updated component, to ensure the updated component was received by the agent application without any errors. While the updated component is received and installed in the agent application, all functions of the agent application, including the component being updated, can maintain operations. In some instances, the agent application downloads and installs the updated component in the background, and the deactivation/reactivation of the updated component is performed after the agent application completes any current work. Such procedure can avoid any interruption to in-flight work.

At step 710, the agent application deactivates a component of the agent application that corresponds to the updated component. In some instances, the agent application deactivates the component while maintaining operations by other components. In effect, the information technology infrastructure management system can continue managing the resources of the private information technology infrastructure, even when the component is deactivated and replaced with an updated component.

In some instances, the agent application performs one or more verification operations prior to replacing the component with the updated component. For example, the agent application can perform an integrity check of the updated component by verifying its checksum value (e.g., SHA-256 value) via a publicly-published GPG key to ensure the update is safe to replace the existing component of the agent application.

At step 712, the agent application replaces the component of the agent application with the updated component received from the second server. In some instances, one or more other components of the agent application continue operating while the component is replaced with the updated component.

At step 714, the agent application activates the updated component thereby facilitating the agent application to use the one or more modified functions for reconfiguring the one or more network resources of the private information technology infrastructure. In some instances, the agent application transmits a status report that indicates whether the replacement of the component of the agent application with the updated component has been completed. In some instances, the agent application receives a third payload comprising a third set of parameters, in which third set of parameters include one or more instructions from the first server to use the updated component to configure the one or more network resources of the private information technology infrastructure. Process 700 terminates thereafter.

VIII. Example of a Computing Environment

Figure 8:
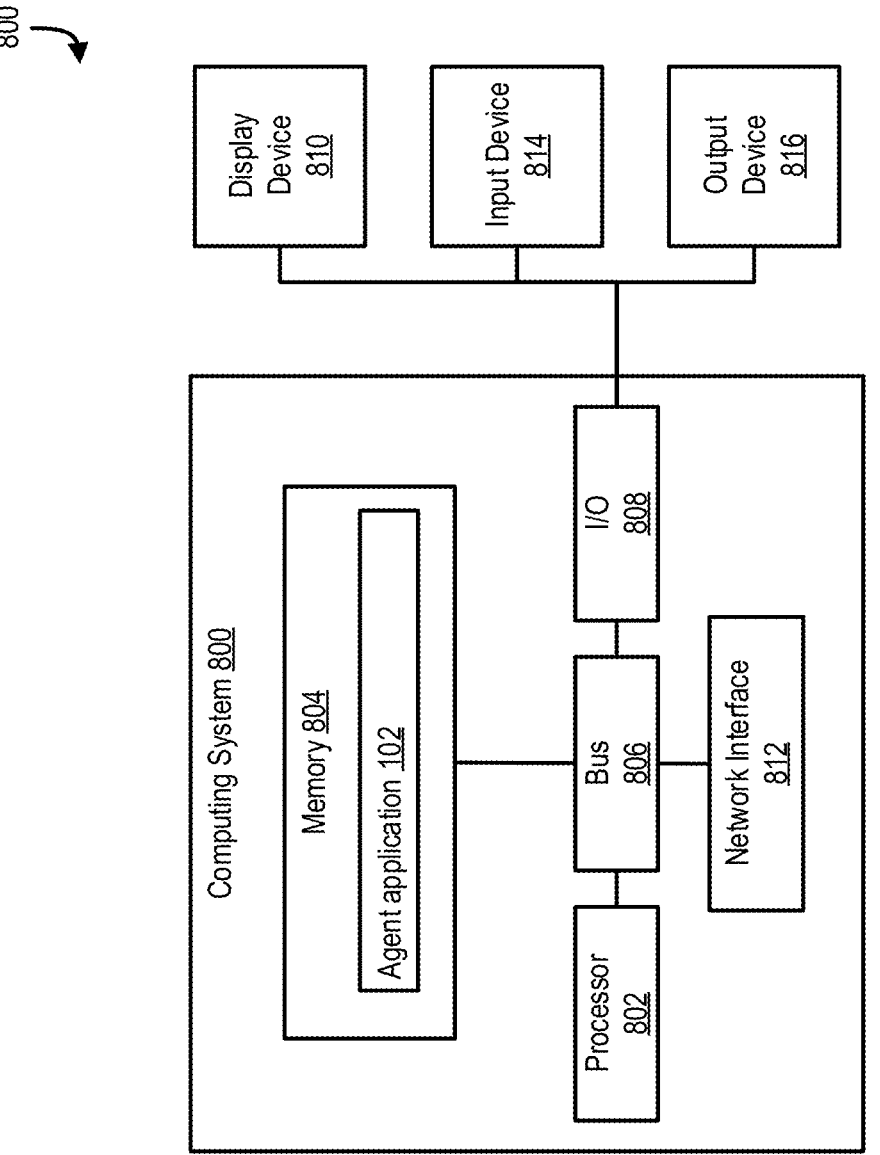
FIG. 8 depicts a computing system 800 that can implement any of the computing systems or environments, in accordance with some embodiments.

Any suitable computing system or group of computing systems can be used for performing the operations described herein. For example, FIG. 8 depicts a computing system 800 that can implement any of the computing systems or environments discussed above. In some embodiments, the computing system 800 includes a processing device 802 that executes the agent application 102, a memory that stores various data computed or used by the agent application 102, an input device 814 (e.g., a mouse, a stylus, a touchpad, a touchscreen, etc.), and an output device 816 that presents output to a user (e.g., a display device that displays graphical content generated by the agent application 102). For illustrative purposes, FIG. 8 depicts a single computing system on which the agent application 102 is executed, and the input device 814 and output device 816 are present. But these applications, datasets, and devices can be stored or included across different computing systems having devices similar to the devices depicted in FIG. 8.

The example of FIG. 8 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C#, Visual Basic, Java, Python, Perl, JavaScript, and ActionScript.

The computing system 800 could also include a number of external or internal devices, such as a display device 810, or other input or output devices. For example, the computing system 800 is shown with one or more input/output ("I/O") interfaces 808. An I/O interface 808 can receive input from input devices or provide output to output devices. One or more buses 806 are also included in the computing system 800. Each bus 806 communicatively couples one or more components of the computing system 800 to each other or to an external component.

The computing system 800 executes program code that configures the processing device 802 to perform one or more of the operations described herein. The program code includes, for example, code implementing the agent application 102 or other suitable applications that perform one or more operations described herein. The program code can be resident in the memory device 804 or any suitable computer-readable medium and can be executed by the processing device 802 or any other suitable processor. In some embodiments, all modules in the agent application 102 are stored in the memory device 804, as depicted in FIG. 8. In additional or alternative embodiments, one or more of these modules from the agent application 102 are stored in different memory devices of different computing systems.

In some embodiments, the computing system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computing system 800 is able to communicate with one or more other computing devices (e.g., a computing device that receives inputs for agent application 102 or displays outputs of the agent application 102) via a data network using the network interface device 812.

An input device 814 can include any device or group of devices suitable for receiving visual, auditory, or other suitable input that controls or affects the operations of the processing device 802. Non-limiting examples of the input device 814 include a touchscreen, stylus, a mouse, a keyboard, a microphone, a separate mobile computing device, etc. An output device 816 can include any device or group of devices suitable for providing visual, auditory, or other suitable sensory output. Non-limiting examples of the output device 816 include a touchscreen, a monitor, a separate mobile computing device, etc.

Although FIG. 8 depicts the input device 814 and the output device 816 as being local to the computing device that executes the agent application 102, other implementations are possible. For instance, in some embodiments, one or more of the input device 814 and the output device 816 include a remote client-computing device that communicates with the computing system 800 via the network interface device 812 using one or more data networks described herein.

IX. General Considerations

Numerous specific details are set forth herein to provide a thorough understanding of the claimed subject matter. However, those skilled in the art will understand that the claimed subject matter could be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages could be used to implement the teachings contained herein in software to be used in programming or configuring a computing device.

Embodiments of the methods disclosed herein can be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values could, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, could readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:

receiving, by an agent application of a private information technology infrastructure and from a first server of an information technology infrastructure management system, a payload comprising a set of parameters, wherein the set of parameters include information that identifies that an update of the agent application is available, and wherein the agent application is configured to receive one or more instructions from the first server for configuring one or more network resources of the private information technology infrastructure;

parsing, by the agent application, the set of parameters of the payload to determine that the update of the agent application is available;

requesting, by the agent application and from a second server of the information technology infrastructure management system, an updated component for modifying one or more functions of the agent application, the updated component including a plug-in component configured to replace an existing component of the agent application;

receiving, by the agent application and from the second server of the information technology infrastructure management system, the updated component;

deactivating, by the agent application, the existing component of the agent application that corresponds to the updated component;

replacing, by the agent application, the existing component of the agent application with the updated component received from the second server, wherein one or more other components of the agent application continue operating, the one or more other components including a host component implementing a command-line interface (CLI) process; and activating, by the agent application, the updated component thereby facilitating the agent application to use the one or more modified functions for reconfiguring the one or more network resources of the private information technology infrastructure, wherein the agent application verifies that updated component using a cryptographic signature associated with the updated component prior to replacing the component, and wherein the updated component is executed from the one or more other components during activation.

2. The method of claim 1, wherein the payload corresponds to at least part of a JavaScript Object Notation (JSON) data transmitted by the first server of the information technology infrastructure management system.

3. The method of claim 1, further comprising transmitting, by the agent application, a status report that indicates whether the replacement of the component of the agent application with the updated component has been completed.

4. The method of claim 1, further comprising determining, by the agent application, a checksum value corresponding to the updated component and comparing the checksum value to a reference checksum value received with the updated component to verify the integrity of the updated component prior to replacing the component.

5. The method of claim 1, further comprising transmitting, by the agent application, a plurality of requests to the first server of the information technology infrastructure management system, wherein each of the plurality of requests is transmitted at a time point of a preconfigured time interval.

6. The method of claim 1, wherein the first server and the second server of the information technology infrastructure management system are the same.

7. The method of claim 1, wherein the payload is received from the information technology infrastructure management system via a virtual private network gateway.

8. The method of claim 1, wherein the agent application being configured to receive the one or more instructions from the first server further includes receiving a second payload comprising a second set of parameters, wherein the second set of parameters include one or more instructions from the first server to use the component to configure the one or more network resources of the private information technology infrastructure.

9. The method of claim 1, further comprising receiving a third payload comprising a third set of parameters, wherein the third set of parameters include one or more instructions from the first server to use the updated component to configure the one or more network resources of the private information technology infrastructure.

10. A system comprising: one or more data processors; and a non-transitory computer readable storage medium containing instructions which, when executed on the one or more data processors, cause the one or more data processors to perform operations comprising:

receiving, from a first server of an information technology infrastructure management system, a payload comprising a set of parameters, wherein the set of parameters include information that identifies that an update of an agent application is available, and wherein the agent application is configured to receive one or more instructions from the first server for configuring one or more network resources of a private information technology infrastructure;

parsing the set of parameters of the payload to determine that the update of the agent application is available;

requesting, from a second server of the information technology infrastructure management system, an updated component for modifying one or more functions of the agent application, the updated component including a plug-in component configured to replace an existing component of the agent application;

receiving, from the second server of the information technology infrastructure management system, the updated component;

deactivating the existing component of the agent application that corresponds to the updated component;

replacing the existing component of the agent application with the updated component received from the second server, wherein one or more other components of the agent application continue operating, the one or more other components including a host component implementing a command-line interface (CLI) process; and activating the updated component thereby facilitating the agent application to use the one or more modified functions for reconfiguring the one or more network resources of the private information technology infrastructure, wherein the agent application verifies that updated component using a cryptographic signature associated with the updated component prior to replacing the component, and wherein the updated component is executed in a sandboxed environment within the agent application to isolate the updated component from the one or more other components during activation.

11. The system of claim 10, wherein the payload corresponds to at least part of a JavaScript Object Notation (JSON) data transmitted by the first server of the information technology infrastructure management system.

12. The system of claim 10, wherein the instructions further cause the one or more data processors to perform operations comprising transmitting a status report that indicates whether the replacement of the component of the agent application with the updated component has been completed.

13. The system of claim 10, wherein the instructions further cause the one or more data processors to perform operations comprising determining a checksum value corresponding to the updated component and comparing the checksum value to a reference checksum value received with the updated component to verify the integrity of the updated component prior to replacing the component.

14. The system of claim 10, wherein the instructions further cause the one or more data processors to perform operations comprising transmitting a plurality of requests to the first server of the information technology infrastructure management system, wherein each of the plurality of requests is transmitted at a time point of a preconfigured time interval.

15. The system of claim 10, wherein the first server and the second server of the information technology infrastructure management system are the same.

16. The system of claim 10, the payload is received from the information technology infrastructure management system via a virtual private network gateway.

17. A computer-program product tangibly embodied in a non-transitory machine-readable storage medium, including instructions configured to cause one or more data processors to perform operations comprising:

receiving, from a first server of an information technology infrastructure management system, a payload comprising a set of parameters, wherein the set of parameters include information that identifies that an update of an agent application is available, and wherein the agent application is configured to receive one or more instructions from the first server for configuring one or more network resources of a private information technology infrastructure;

parsing the set of parameters of the payload to determine that the update of the agent application is available;

requesting, from a second server of the information technology infrastructure management system, an updated component for modifying one or more functions of the agent application, the updated component including a plug-in component configured to replace an existing component of the agent application;

receiving, from the second server of the information technology infrastructure management system, the updated component;

deactivating the existing component of the agent application that corresponds to the updated component;

replacing the existing component of the agent application with the updated component received from the second server, wherein one or more other components of the agent application continue operating, the one or more other components including a host component implementing a command-line interface (CLI) process; and activating the updated component thereby facilitating the agent application to use the one or more modified functions for reconfiguring the one or more network resources of the private information technology infrastructure, wherein the agent application verifies that updated component using a cryptographic signature associated with the updated component prior to replacing the component, and wherein the updated component is executed in a sandboxed environment within the agent application to isolate the updated component from the one or more other components during activation.

18. The computer-program product of claim 17, wherein the payload corresponds to at least part of a JavaScript Object Notation (JSON) data transmitted by the first server of the information technology infrastructure management system.

19. The computer-program product of claim 17, wherein the instructions further cause the one or more data processors to perform operations comprising transmitting a status report that indicates whether the replacement of the component of the agent application with the updated component has been completed.

20. The computer-program product of claim 17, wherein the instructions further cause the one or more data processors to perform operations comprising determining a checksum value corresponding to the updated component and comparing the checksum value to a reference checksum value received with the updated component to verify the integrity of the updated component prior to replacing the component.

21. The computer-program product of claim 17, wherein the instructions further cause the one or more data processors to perform operations comprising transmitting a plurality of requests to the first server of the information technology infrastructure management system, wherein each of the plurality of requests is transmitted at a time point of a preconfigured time interval.

22. The computer-program product of claim 17, wherein the first server and the second server of the information technology infrastructure management system are the same.

\* \* \* \* \*